United States Patent
Chen et al.

(10) Patent No.: US 10,429,264 B1
(45) Date of Patent: Oct. 1, 2019

(54) DEVICE FOR DETECTING BALANCE OF HUB VALVE HOLE

(71) Applicant: CITIC DICASTAL CO., LTD, Qinhuangdao, Hebei (CN)

(72) Inventors: Guogang Chen, Hebei (CN); Jinqi Lyu, Hebei (CN); Lijun An, Hebei (CN); Yingfeng Wang, Hebei (CN); Lei Jiang, Hebei (CN); Zhigao Yin, Hebei (CN); Chunhai Liu, Hebei (CN); Zhihua Zhu, Hebei (CN); Hongmei Liu, Hebei (CN)

(73) Assignee: Citic Dicastal Co., Ltd, Qinhuangdao (CN)

( * ) Notice: Subject to any disclaimer, the term of this patent is extended or adjusted under 35 U.S.C. 154(b) by 0 days.

(21) Appl. No.: 16/266,875

(22) Filed: Feb. 4, 2019

(30) Foreign Application Priority Data

Mar. 29, 2018 (CN) .......................... 2018 1 0271140

(51) Int. Cl.
*G01N 21/00* (2006.01)
*G01M 3/02* (2006.01)
*G01B 11/00* (2006.01)

(52) U.S. Cl.
CPC ........... *G01M 3/022* (2013.01); *G01B 11/002* (2013.01)

(58) Field of Classification Search
CPC ......... G01M 3/00; G01M 3/025; G01B 11/00; B64C 11/06; B64C 11/38; B60K 1/04; B60L 11/18; B23C 3/12
See application file for complete search history.

(56) References Cited

U.S. PATENT DOCUMENTS 4,407,384 A * 10/1983 Auty ..................... B62D 5/10
                                                    137/625.68

* cited by examiner

*Primary Examiner* — Abdullahi Nur
(74) *Attorney, Agent, or Firm* — Price Heneveld LLP

(57) ABSTRACT

A device for detecting the balance of a hub valve hole that includes a hub conveying roller bed configured to sequentially convey a hub from an upstream of a conveying belt to a hub identification device and a valve hole balance detection device until the hub leaves the valve hole balance detection device, wherein the hub identification device includes an electronic belt scale configured to obtain the weight of the hub and an industrial camera configured to take a photo of a wheel disc of the hub when the hub is conveyed to the hub identification device. The device can accurately identify the hub type and then automatically complete the valve hole compensation function of balance detection through the combination of the above components, program control and an algorithm, thereby improving the automation level and reducing the repeated operation of an operator.

2 Claims, 1 Drawing Sheet

DEVICE FOR DETECTING BALANCE OF HUB VALVE HOLE

CROSS REFERENCE TO RELATED APPLICATION

This application claims priority to Chinese Patent Application No. 201810271140.0, entitled DEVICE FOR DETECTING BALANCE OF HUB VALVE HOLE and filed on Mar. 29, 2018, which is incorporated herein by reference for all purposes.

FIELD OF THE INVENTION

The present invention relates to a hub valve hole detection device and an automatic weight compensation method.

BACKGROUND OF THE INVENTION

Balance detection is required after hub machining to identify balance rejects. Since the motor vehicle main engine plant requires the balance amount of a hub to meet the balance requirement of loading, a weight substitute having the weight and size matching the requirements of the main engine plant needs to be installed at a valve hole during balance detection of a hub. Since different wheel types have different weight requirements, the wheel type is manually identified during balance detection of a hub, and then a weight substitute is manually installed, followed by the balance detection.

The previous work relies entirely on the manual operation of an operator, and the weight substitute is manually removed after the balance detection, so this is a typical repetitive work, and the manual operation efficiency is low. Therefore, the use of a hub valve hole detection device can automatically complete valve hole weight compensation after the wheel type is identified. This device solves the problems of relying on personnel identification and repeated single operation, improves the labor productivity and perfects the automation of hub detection.

SUMMARY OF THE INVENTION

Accordingly, an object of the present invention is to provide a hub valve hole detection device capable of automatically detecting the position of a valve hole of a hub during balance detection, and then automatically compensating the weight at the position of the valve hole according to the hub type.

In order to achieve the above object, the present invention provides the following technical solution:

In one aspect of the present invention, provided is a device for detecting the balance of a hub valve hole, comprising a hub conveying roller bed, a hub identification device, a valve hole balance detection device and a processor, the hub conveying roller bed is configured to sequentially convey a hub from the upstream of a conveying belt to the hub identification device and the valve hole balance detection device till the hub leaves the valve hole balance detection device; the hub identification device comprises an electronic belt scale and an industrial camera, the electronic belt scale is configured to obtain the weight of the hub when the hub is conveyed to the hub identification device, the industrial camera is configured to take a front photo of a wheel disc of the hub when the hub is conveyed to the hub identification device, and the electronic belt scale and the industrial camera are both in data connection with the processor; the valve hole balance detection device comprises a spindle, an industrial camera, a laser generating device and a laser receiving device, wherein the spindle is configured to clamp and rotate the hub when the hub reaches the valve hole balance detection device; the industrial camera is configured to face the front of the wheel disc of the hub; the laser generating device and the laser receiving device are configured to emit laser, detect laser reflection at a bolt hole of the wheel disc and transmit the reflected signal to the processor; and the processor is configured to receive the laser reflection from the laser generating device and the laser receiving device which are used for emitting laser and detecting the laser reflection at the bolt hole of the wheel disc by, and calculate the weight compensation.

The valve hole detection device further comprises an encoder, which is configured to calculate a phase angle of the valve hole of the hub.

In another aspect of the present invention, further provided is a method for detecting the balance of a hub valve hole using the device described above, the method comprising the steps of: (1) conveying a hub to be detected to a hub identification device by a hub conveying roller bed; (2) obtaining the weight of the hub by an electronic belt scale when the hub is conveyed to the hub identification device, taking a front photo of a wheel disc of the hub by an industrial camera when the hub is conveyed to the hub identification device, transmitting the weight and the front photo to a processor by the electronic belt scale and the industrial camera, and comparing the information with the hub information preset in the processor to determine a hub type by the processor; (3) conveying the hub to be detected to a balance detection station by the hub conveying roller bed, clamping and rotating the hub by a spindle, driving a laser emitting device by a servo drive device to directionally scan the hub, detecting the laser reflection at a bolt hole of the wheel disc by a laser receiving device, recording the time, transmitting the reflected signal to the processor, and determining the position of the phase angle of the valve hole by the processor; and (4) calculating the weight compensation for the position of the valve hole according to the hub based on the phase angle of the valve hole, and detecting the compensated balance amount after the second circle of rotation begins.

The technical solution of the present invention has the following advantages:

(1) The device adopts the electronic belt scale as a detecting element for the hub identification, which can realize rough hub identification and positioning confirmation on the presence or absence of a hub.

(2) The device can further accurately identify the weight by using the industrial camera.

(3) The device using servo drive has the characteristics of fast and stable operation and accurate and reliable positioning.

(4) The device uses the rotary encoder to achieve precise positioning of the hub valve hole.

(5) The device can accurately identify the hub type and then automatically complete the valve hole compensation function of balance detection through the combination of the above components, program control and an algorithm, thereby improving the automation level and reducing the repeated operation of an operator.

BRIEF DESCRIPTION OF THE DRAWINGS

The embodiments of the present invention will be described in detail below in combination with the accompanying drawings, in which.

Figure 1:
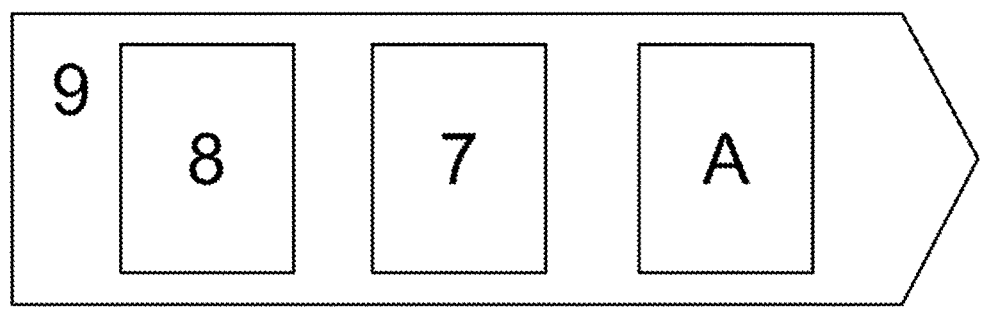
FIG. 1 is a structural layout diagram of a hub valve hole detection device.
Figure 2:
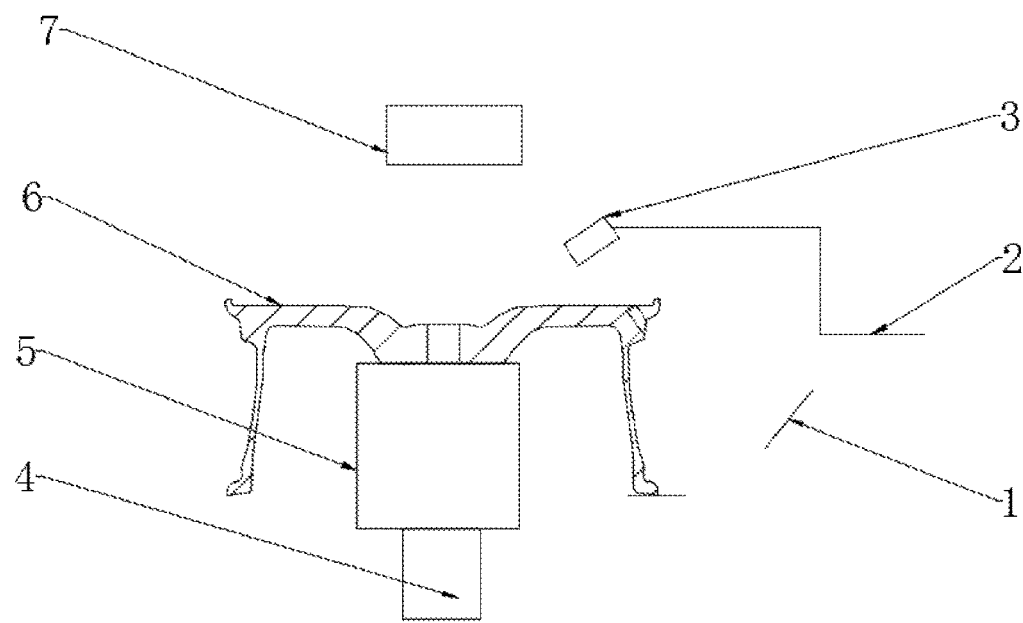
FIG. 2 is a structure diagram of the hub valve hole detection device.

In which, 1—laser receiving device, 2—servo drive device, 3—laser emitting device, 4—rotary encoder, 5—spindle clamp, 6—hub, 7—industrial camera, 8—electronic belt scale, 9—roller bed, A—valve hole detection device.

DETAILED DESCRIPTION OF THE EMBODIMENTS

Embodiment 1: A Hub Valve Hole Detection Device

The hub valve hole detection device will be described in detail below in combination with the accompanying drawings.

The hub valve hole detection device comprises a laser receiving device 1, a servo drive device 2, a laser emitting device 3, a rotary encoder 4, a spindle clamp 5, a hub 6, an industrial camera 7, an electronic belt scale 8, and a roller bed 9.

The hub 6 on the roller bed 9 is first weighed by the electronic belt scale 8 of the hub valve hole detection device, roughly identified and positioned, that is, different hub types are distinguished by weight.

When the roughly identified hub 6 runs to a photographing station of the industrial camera 7, the hub 6 stops moving, and is photographed for accurate identification. The type of the hub 6 is finally accurately identified through the two criteria comprising the weight of the hub and the photo.

Then, the hub 6 runs to a balance detection station, the spindle clamp 5 clamps the hub 6 to rotate at a high speed, and balance detection and confirmation on a phase angle of a valve hole are performed at the first circle of rotation. At the same time, the servo drive device 2 drives the laser generating device 3 to directionally scan the hub 6. Since the hub 6 has only one valve hole, when the laser receiving device 1 receives a laser projection signal passing through the valve hole, the time is recorded and transmitted to the spindle rotary encoder 4, and the phase angle of the valve hole is accurately positioned at the moment of projection detection.

After the phase angle of the valve hole is determined, the weight compensation is calculated by an automatic compensation program for the position of the valve hole according to the hub type. After the second circle of rotation begins, the balance amount detection after compensation is performed. The balance amount of the first circle is compared with the balance amount of the second circle through program analysis to automatically determine whether the weight compensation calculation is valid.

Embodiment 2: A Hub Valve Hole Detection Device

As described in Embodiment 1, after different types of hubs 6 are preliminarily weighed by the electronic belt scale 8 and identified, the weight of the hub 6 is compared with the database of an industrial personal computer for rough analysis, then the hub 6 runs to the station of the industrial camera 7, and the unique type of the hub is identified.

For example, the weight of the hub 6 is measured to give a weight fluctuation range of ±100 g; the similarity of the measured photos of the hub 6 is matched by 95%; the criterion is that the wheel type having the similarity of more than 95% is subjected to weighing data comparison, and the type of the hub 6 is distinguished through the weight; and unique determination is performed on the hub 6 having the picture similarity of less than 95%, so that accurate identification on the type of the hub 6 can be ensured.

After the type of the hub 6 is determined, the weight value of the valve hole weight is called in advance by a program. After the phase angle of the valve hole of the hub 6 is detected, the weight value of the weight is superimposed to the balance measurement data of the hub 6 in phase, and then the balance amount of the hub 6 after balancing is calculated.

Through verification of weight balance test with manual installation, 1000 different types of hubs 6 are detected. The detection device and method can realize zero error identification, the consistency of balance amount detection data reaches 96%, and the purpose of balance detection by automatic balancing with valve hole phase detection is achieved.

The invention claimed is:

1. A device for detecting balance of a hub valve hole, comprising:
   a hub conveying roller bed, a hub identification device, a valve hole balance detection device and a processor;
   wherein the hub conveying roller bed is configured to sequentially convey a hub from an upstream of a conveying belt to the hub identification device and the valve hole balance detection device until the hub leaves the valve hole balance detection device;
   wherein the hub identification device comprises an electronic belt scale and an industrial camera, the electronic belt scale is configured to obtain a weight of the hub when the hub is conveyed to the hub identification device, the industrial camera is configured to take a front photo of a wheel disc of the hub when the hub is conveyed to the hub identification device, and the electronic belt scale and the industrial camera are both in data connection with the processor;
   wherein the valve hole balance detection device comprises a spindle, an industrial camera, a laser generating device and a laser receiving device, wherein the spindle is configured to clamp and rotate the hub when the hub reaches the valve hole balance detection device;
   wherein the industrial camera is configured to face the front of the wheel disc of the hub;
   wherein the laser generating device and the laser receiving device are configured to emit laser, detect laser reflection at a bolt hole of the wheel disc and transmit a reflected signal to the processor; and
   wherein the processor is configured to receive the laser reflection from the laser generating device and the laser receiving device which are used for emitting laser and detecting the laser reflection at the bolt hole of the wheel disc, and calculate a weight compensation.

2. The device for detecting balance of a hub valve hole according to claim 1, wherein the valve hole detection device further comprises an encoder, which is configured to calculate a phase angle of the valve hole of the hub.

* * * * *